3,180,809
TANTALUM CAPACITOR MANUFACTURE
Richard F. Gregori, Norwood, Mass., assignor to Cornell-Dubilier Electric Corporation, a corporation of Delaware
No Drawing. Filed June 12, 1962, Ser. No. 201,762
1 Claim. (Cl. 204—56)

The present invention relates to tantalum capacitors and in particular to improved methods of manufacturing tantalum anodes.

An object of the invention resides in the provision of a novel method of electrolytically forming tantalum anodes, for increased yield, i.e., decreased rejection rate, in the production of tantalum capacitors.

Another object of this invention is to improve the formed oxide film on the anodes of tantalum anodes, for attaining higher operating voltage in the completed capacitors using such anodes.

Still another object of the invention relates to an improvement in the forming of anodes as an operation preceding the deposition of manganese nitrate and subsequent pyrolytic decomposition of the manganese nitrate into manganese dioxide. This pyrolytic decomposition has been a customary operation in the manufacture of so-called dry tantalum capacitors. It results in a semiconductive oxide in contact with the formed oxide. However, this operation seems to damage the previously formed oxide on the tantalum. The deterioration is due perhaps to the action of the nitrogen compounds that are given off as part of the decomposition process. In order to deposit a sufficient bulk of manganese dioxide it is necessary to recycle the anodes, repeatedly impregnating with manganese nitrate and then firing. The number of repeat cycles permissible is limited by the deterioration that normally occurs. The preparatory forming treatment provided by the present invention makes possible a greater number of impregnating and firing cycles or, viewed otherwise, reduces the deterioration that tends to occur incidental to the build-up of manganese dioxide in any given number of cycles. A sufficient amount of manganese dioxide is needed to provide properly low resistance of a dry tantalum capacitor. The maximum operating voltage and the leakage current at any given voltage near maximum are impaired by repeated cycles of impregnation with $Mn(NO_3)_2$ and its pyrolytic decomposition.

In achieving the foregoing objects in the illustrative embodiment of the invention that is detailed below, sintered tantalum anodes or "slugs" are electrolytically formed in two steps. The first step involves forming the anodes in phosphoric acid to a high voltage, and then electrolytically treating the anodes in strong sulphuric acid but at lower voltage. I believe that in the first step a layer of tantalum oxide builds up, containing trapped ions or atoms of tantalum, and that in the second step such ions are leached out with a resulting cover of improved oxide on the slug. This oxide layer is highly effective in resisting damage during the subsequent pyrolytic processing; it is thinner than previous formed oxides (without reduction in permissible operating voltage) as demonstrated by reduced resistance, and it is more uniform as demonstrated by greater yield of good units in production.

The nature of the invention and its further objects and advantages will be more fully appreciated from the following detailed description of a presently preferred illustrative embodiment.

Tantalum anode slugs are made by presing and sintering tantalum powder, usually containing a volatile binder initially. The slugs are subjected to electrolytic forming treatment in 0.01% phosphoric acid at 90° F., initially at a low voltage that is increased as the current drops. The voltage is increased to 300 volts, and is maintained at that value for ½ hour holding the voltage, at any given time, to a value that produces no more than about 2 milliamperes per anode. After the 300 volt point is reached, the current gradually decreases and levels off at a minimum value.

As a second step, the slugs are treated or "formed" at 125 volts, in 55% sulphuric acid at 125° C. for three hours. Because of the high concentration, the acid remains a liquid at this temperature and does not boil. It is observed that the current drops off rapidly at the beginning of this second step, starting with a current (about 2 milliamperes per anode) that is higher than the minimum attained during the previous treatment and leveling off at a substantially lower current than the previous minimum.

These formed slugs are impregnated with aqueous manganese nitrate solution, dried and fired at about 350° C. to produce manganese dioxide pyrolytically. The impregnation and firing treatments are repeatedly cycled, in an effort to build up the amount of deposited manganese dioxide on and in the porous sintered tantalum anode. As a practical matter, five cycles is usually the maximum used although a sixth is used at times. Completion of a capacitor thereafter follows the usual steps, including through rinsing, coating with graphite and then coating the graphite with conductive silver paint.

While the anodic treatment in a relatively high concentration of sulphuric acid is conducted just as if it were a forming operation and, indeed, the current decreases and levels off as in usual forming treatments, it seems evident that it is not an ordinary forming treatment such as might be carried out using sulphuric acid initially on the sintered tantalum slug. Actually, the sulphuric acid is used on the tantalum oxide film that was formed in the previous weak phosphoric acid forming step.

In the past, when the phosphoric acid forming treatment was depended upon solely, it has been customary to continue the forming treatment considerably longer than is here involved, in an effort to build up the thickness and ruggedness of the formed layer in the hope of attaining improved characteristics. However, while this was successful to a degree in attaining higher voltage ratings and reduced leakage current, there was also a degradation of the dissipation factor. The present forming method can be used to improve the voltage rating of solid tantalum capacitors, and to reduce the leakage current, without suffering an increase in the dissipation factor. Further, with given sizes of anodes, there is an increase in the values of capacitance. This indicates that the oxide coating, while effective in attaining the required voltage ratings, is thinner than in previous practice employing prolonged forming treatments, as with phosphoric acid alone.

It has been noted above that the preparation of the oxide film or coating on the tantalum anodes has special merit in relation to subsequent deposition of semiconducting manganese oxide by a pyrolytic method. However, the thin and electrically rugged oxide coating prepared as described above is a distinct improvement over tantalum oxide coatings formed by prior methods even with other methods of producing semiconducting material on the oxide layer. An improved method of depositing such semiconductive oxide on formed anodes is covered in an application filed by Bernard Wessling concurrently herewith, S.N. 201,804, entitled "Methods of Capacitor Manufacture," assigned to the assignee of this application.

Other variations will be suggested to those skilled in the art, and therefore the invention should be broadly construed in accordance with its spirit and scope.

What is claimed is:

In the method of manufacturing tantalum capacitors, the process of forming a tantalum oxide layer on a tantalum anode, said process including the steps of anodically forming a tantalum anode in aqueous phosphoric acid solution of the order of 0.01% and thereafter subjecting the resulting anode to an anodic forming treatment in sulfuric acid but for a shorter period of time, the sulfuric acid being of the order of 55% concentration of the acid in water, and the forming treatment with phosphoric acid being continued to a higher voltage than the forming treatment with sulfuric acid.

References Cited by the Examiner

UNITED STATES PATENTS

| | | | |
|---|---|---|---|
| 2,871,425 | 1/59 | Burnham | 204—56 |
| 2,930,951 | 3/60 | Burger et al. | 204—38 |
| 3,087,872 | 4/63 | Bernard | 204—42 |

JOHN H. MACK, *Primary Examiner.*

JOHN R. SPECK, MURRAY TILLMAN, *Examiner.*